United States Patent [19]
Vandenberg

[11] Patent Number: 5,208,053
[45] Date of Patent: May 4, 1993

[54] RUNNER SHUT-OFF FOR AN INJECTION MOLDING SYSTEM

[76] Inventor: Leo A. Vandenberg, 1032 Heartwood La., Lake Zurich, Ill. 60047

[21] Appl. No.: 770,440

[22] Filed: Oct. 3, 1991

[51] Int. Cl.⁵ .............................................. B29C 45/32
[52] U.S. Cl. ............................. 425/572; 264/328.12; 425/577; 425/588
[58] Field of Search ............... 425/562, 572, 577, 588; 264/328.12

[56] References Cited

U.S. PATENT DOCUMENTS

| | | | |
|---|---|---|---|
| 3,819,313 | 6/1974 | Josephsen et al. | 425/564 |
| 4,242,073 | 12/1980 | Tsuchiya et al. | 425/572 |
| 4,337,027 | 6/1982 | Montieth | 425/562 |
| 4,708,314 | 11/1987 | Kuhling | 425/190 |
| 4,909,725 | 3/1990 | Ward | 425/562 |

*Primary Examiner*—Tim Heitbrink
*Attorney, Agent, or Firm*—Henderson & Sturm

[57] ABSTRACT

A runner shut-off for an injection molding system press fit into a blind bore formed in one of the mold plates. The bore cuts through one of the runners that supplies material to the mold cavities. The runner shut-off includes a casing and a core pin rotatably received in the casing. The core pin is movable to a number of discrete rotated positions with respect to the casing. Slots are formed in the casing and the core pin to join the runners cut by the bore when the core pin is rotated to a position allowing flow of material.

11 Claims, 2 Drawing Sheets

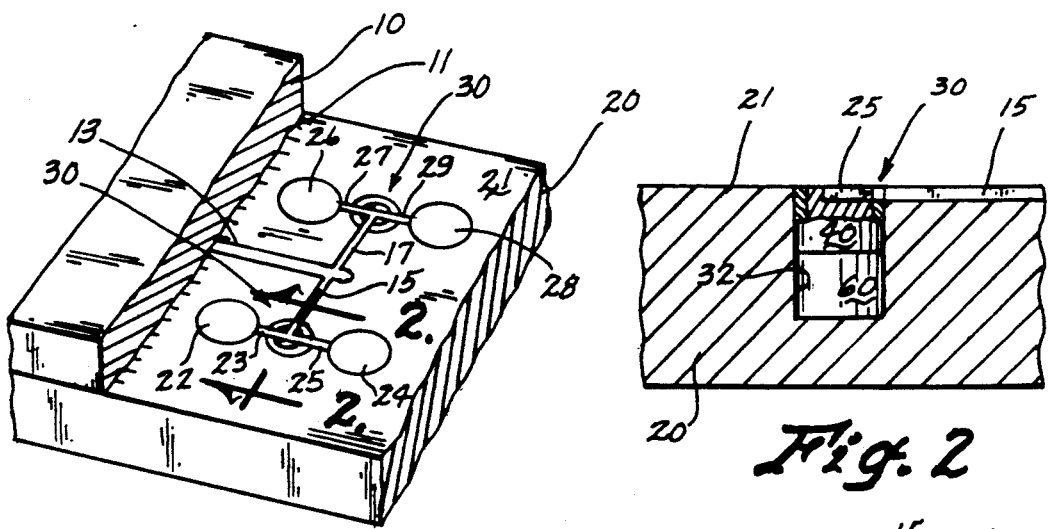
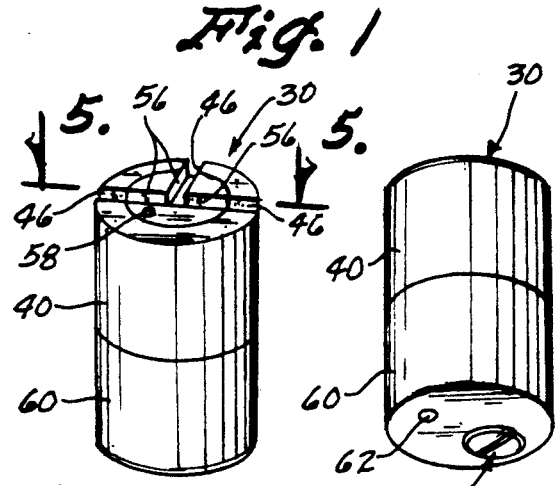
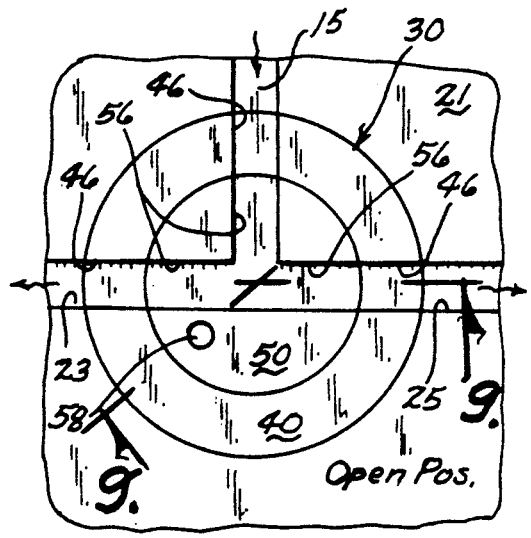
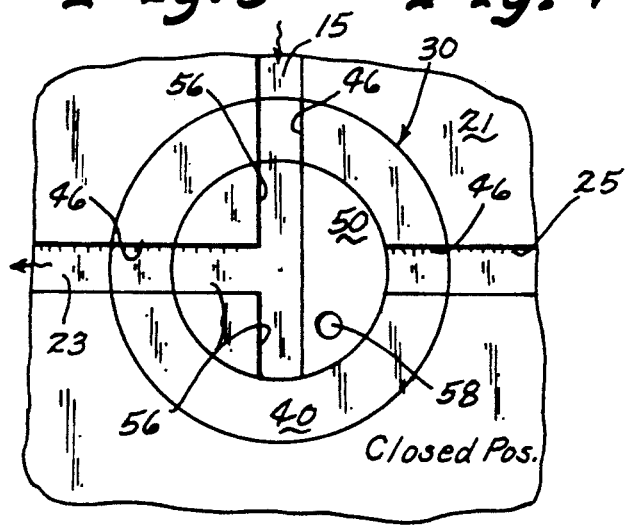

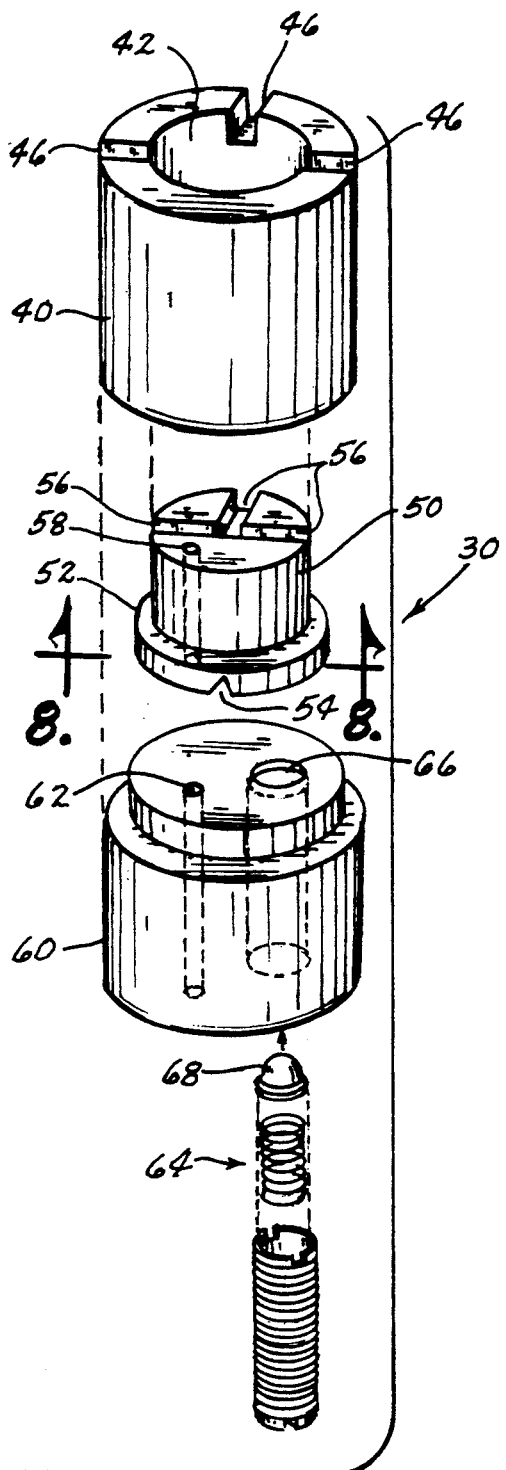
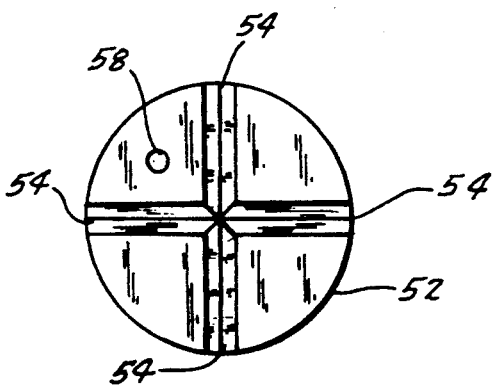
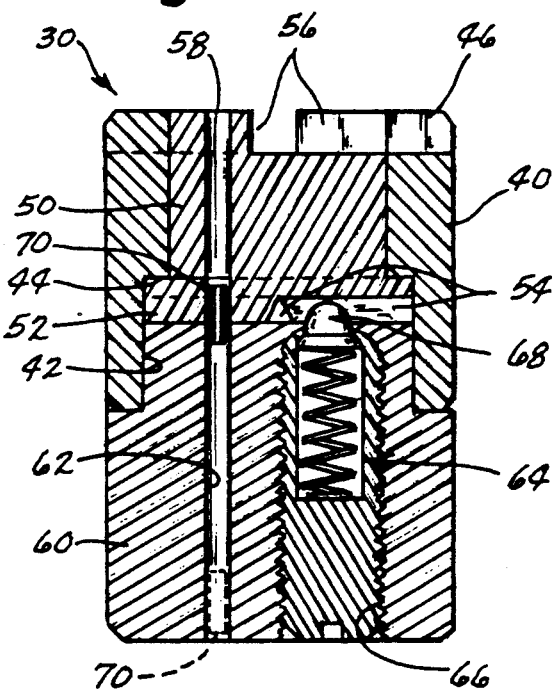

5,208,053

RUNNER SHUT-OFF FOR AN INJECTION MOLDING SYSTEM

TECHNICAL FIELD

This invention relates to injection molding systems, and more particularly to a runner shutoff for selectively directing the flow of molten material to mold cavities.

BACKGROUND ART

When injection molding systems use multi-cavity molds it is frequently desirable to shut-off one or more of the cavities if they are damaged. For example, an eight cavity mold may still be economically used if two of the eight cavities are shut-off.

Runner switches such as those described in U.S. Pat. No. 4,909,725 are currently available. However, these switches require assembly and are expensive to install in the mold plates since they extend entirely through the plate and must be keyed, counter bored and healed from the back of the plate. Also, installation of these switches can result in mismatching of the material supply runners with the slots cut in the switch.

Those concerned with these and other problems recognize the need for an improved runner shut-off for an injection molding system.

DISCLOSURE OF THE INVENTION

The present invention provides a runner shutoff for an injection molding system press fit into a blind bore formed in one of the mold plates. The bore cuts through one of the runners that supplies material to the mold cavities. The runner shut-off includes a casing and a core pin rotatably received in the casing. The core pin is movable to a number of discrete rotated positions with respect to the casing. Slots are formed in the casing and the core pin to join the runners cut by the bore when the core pin is rotated to a position allowing flow of material.

An object of the present invention is the provision of an improved runner shut off for an injection molding system.

Another object is to provide a runner shut-off that is uncomplicated in structure and inexpensive to manufacture.

A further object of the invention is the provision of a runner shut-off that is press fit into a blind bore formed in one of the mold plates.

Still another object is to provide a runner shut-off that is easy and inexpensive to install.

A still further object of the present invention is the provision of a runner shut-off that is durable and easy to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a partial cutaway perspective view of a pair of mold plates forming a multi-cavity mold where the cavities are fed by supply runners, and wherein the runner shut-off of the present invention is used to selectively direct the flow of material to the cavities;

FIG. 2 is a side elevation sectional view taken along line 2—2 of FIG. 1 showing the runner shut-off press fit into a blind bore formed in one of the mold plates;

FIG. 3 is an enlarged perspective view of the runner shut-off as viewed from the top;

FIG. 4 is an enlarged perspective view of the runner shut-off as viewed from the bottom;

FIG. 5 is a greatly enlarged partial top plan view of the runner shut off shown in the lower part of FIG. 1 wherein the core pin is rotated to a position with respect to the casing such that flow of molding material to both the left and right cavities is allowed;

FIG. 6 is a view similar to FIG. 5, but showing the core pin rotated to a position with respect to the casing such that flow of molding material to the left cavity is allowed and flow of material to the right cavity is prevented;

FIG. 7 is an exploded perspective view showing the arrangement of the components of the runner shut-off;

FIG. 8 is a bottom plan view taken along line 8—8 of FIG. 7 showing the radial grooves in the lower enlarged flange portion of the core pin; and FIG. 9 is a sectional view taken along line 9—9 of FIG. 5.

BEST MODE FOR CARRYING OUT THE INVENTION

Referring now to the drawings, wherein like reference numerals designate identical or corresponding parts throughout the several views, FIG. 1 shows upper and lower mold plates (10 and 20) having mating surfaces (11 and 21) secured together to form a number of mold cavities (22, 24, 26 and 28). Molding material is supplied to the mold cavities (22, 24, 26 and 28) through main supply runner (13), primary branch runners (15 and 17), and secondary branch runners (23, 25, 27 and 29). The runner shut-off (30) of the present invention is shown press fit into the lower mold plate (20) at the junctures of primary and secondary branch runners (15, 23, 25 and 17, 27, 29).

As illustrated in FIG. 2, the runner shut-off (30) is received in a blind bore (32) that extends from the surface (21) of the mold plate (20) to a predetermined depth that is less than the total thickness of the mold plate (20). The blind bore (32) is positioned to cut through the primary and secondary branch runners (15, 23, 25) that feed molding material to the mold cavities (22 and 24).

As best shown in FIGS. 7-9, the runner shut-off (30) includes an outer casing (40), a core pin (50) and a retainer (60). The outer casing (40) has a central stepped bore (42) that forms a seating shoulder (44). Slots (46) are formed in the top portion of the casing (40) in alignment with the primary and secondary branch runners (15, 23, 25).

The core pin (50) is rotatably received in the casing (40) and includes a lower enlarged flange portion (52) that engages the shoulder (44) to prevent upward axial movement of the core pin (50) with respect to the casing (40). Radial grooves (54) are formed on the underside at the flange (52), slots (56) are formed in the top of the core pin (50) in alignment with the slots (46) in the casing (40), and an opening (58) is formed through the body of the core pin (50).

The retainer (60) is received in the bottom of the casing (40) and an opening (62) is formed through the body of the retainer (60) in registry with opening (58) in the core pin (50). A spring biased detent (64) is threadably received in a threaded opening (66) such that the spring biased ball (68) extends up to engage one of the radial grooves (54) in the core pin (50). The core pin (50) is selectively rotated to any rotated position, and engagement of the detent (64) in one of the radial grooves (54) holds the core pin (50) in the selected position.

The present invention may be used with either new or existing mold plates. When new mold plates are being made the blind bore is positioned at a point where the supply runners will be cut. When existing mold plates are used, the blind bore is made at the juncture of the existing runners. After the bore is drilled, the assembled runner shut-off (30), as illustrated in FIG. 9, is press fit into the bore (32) with the dowel pin (70) positioned in the registered openings (58 and 62) such that it simultaneously engages both the core pin (50) and the retainer (60). Slots (46 and 56), and supply runners if new plates, are then cut, the plate is ground, and the dowel pin (70) is moved by a punch to the dashed line position of FIG. 9 where the core pin (50) is free to rotate with respect to the retainer (60).

FIGS. 5 and 6 illustrate two rotated positions of the core pin (50). FIG. 5 shows the core pin (50) positioned so that the molding material is allowed to flow to both cavities (22 and 24) as indicated by the directional arrows. FIG. 6 shows the core pin (50) rotated 90° counterclockwise so that the flow of material is directed to the left cavity (22) and the flow of material to the right cavity (24) is shut off. If the core pin (50) were rotated an additional 90° counterclockwise (not shown) from the position shown in FIG. 6, the flow to both cavities (22 and 24) would be shut off. If rotated counterclockwise still another 90° (not shown), the flow of material would be directed to the right cavity (24) and the flow to the left cavity (22) would be shut off.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a runner shut off in an injection molding system including a pair of one-piece mold plates having mating surfaces, the mold plates being secured together to form a plurality of mold cavities joined in fluid communication by supply runners formed in one of the mating surfaces of one of the one-piece mold plates, the improvement comprising:
   a cylindrical bore formed in one of the mold plates such that it cuts through one of the supply runners and extends from the surface of the mold plate a predetermined depth less than the total thickness of the mold plate; and
   supply runner shut off means for selectively controlling the flow of a molding material to the mold cavities, the shut off means including an outer casing press-fit into the cylindrical bore and a core pin rotatably received in the casing and being movable to a plurality of rotated positions with respect to the casing.

2. The runner shut off of claim 1 wherein a slot is formed in both the casing and the core pin to join the supply runner cut by the cylindrical bore when the core pin is rotated to a position allowing flow of molding material through the supply runner.

3. The runner shut off of claim 1 wherein the shut off means further includes retainer means for selectively holding the core pin in one of a plurality of rotated positions with respect to the casing.

4. The runner shut off of claim 2 wherein the casing includes a central stepped bore forming a seating shoulder, and the core pin includes a lower enlarged flange portion disposed to engage the seating shoulder such that axial movement of the core pin with respect to the casing is prevented.

5. The runner shut off of claim 3 wherein the casing includes a central stepped bore forming a seating shoulder, and the core pin includes a lower enlarged flange portion disposed to engage the seating shoulder such that axial movement of the core pin with respect to the casing is prevented.

6. The runner shut off of claim 5 wherein a plurality of radial grooves are formed in the lower flange portion of the core pin, and wherein the retainer means includes a spring biased detent attached to a retainer body and disposed to contact and selectively engage one of the grooves in the core pin.

7. The runner shut off of claim 6 wherein registerable openings are formed in the core pin and the retainer body, and wherein a dowel pin is disposed in the openings to simultaneously engage and prevent rotation of the core pin with respect to the retainer body while the shut off means is being press-fit into the cylindrical bore and while the slot is being formed in the casing and the core pin, the dowel pin being subsequently disengaged from the core pin to allow rotating with respect to the retainer body and the casing.

8. In a runner shut off in an injection molding system including a pair of mold plates having mating surfaces, the mold plates being secured together to form a plurality of mold cavities joined in fluid communication by supply runners formed in one of the mating surfaces, the improvement comprising:
   a cylindrical bore formed in one of the mold plates such that it cuts through one of the supply runners;
   supply runner shut off means for selectively controlling the flow of a molding material to the mold cavities, the shut off means including:
      an outer casing press-fit into the cylindrical bore;
      a core pin rotatably received in the casing and being movable to a plurality of rotated positions with respect to the casing; and
      retainer means for selectively holding the core pin in one of a plurality of rotated positions with respect to the casing, the retainer means including a retainer body wherein registerable openings are formed in the core pin and the retainer body, and wherein a dowel pin is disposed in the openings to simultaneously engage and prevent rotation of the core pin with respect to the retainer body while the shut off means is being press-fit into the cylindrical bore, the dowel pin being subsequently disengaged from the core pin to allow rotation with respect to the retainer body and the casing.

9. The runner shut off of claim 8 wherein a slot is formed in both the casing and the core pin to join the supply runner cut by the cylindrical bore when the core pin is rotated to a position allowing flow of molding material through the supply runner.

10. The runner shut off of claim 9 wherein the casing includes a central stepped bore forming a seating shoulder, and the core pin includes a lower enlarged flange portion disposed to engage the seating shoulder such that axial movement of the core pin with respect to the casing is prevented.

11. The runner shut off of claim 10 wherein a plurality of radial grooves are found in the lower flange portion of the core pin, and wherein the retainer means includes a spring biased detent attached to a retainer body and disposed to contact and selectively engage one of the grooves in the core pin.

* * * * *